April 14, 1942.   O. C. MARTIN   2,279,693
VALVE
Filed March 11, 1940   2 Sheets-Sheet 1

INVENTOR
OTIS C. MARTIN
BY
ATTORNEY

April 14, 1942. O. C. MARTIN 2,279,693
VALVE
Filed March 11, 1940 2 Sheets-Sheet 2
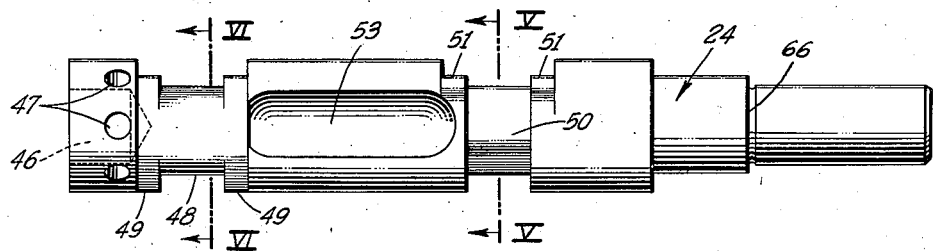
Fig. 4.
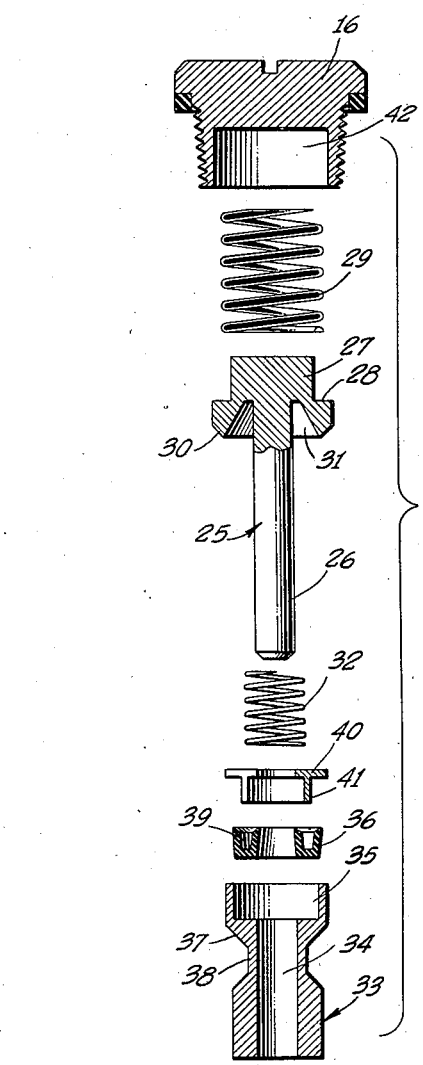
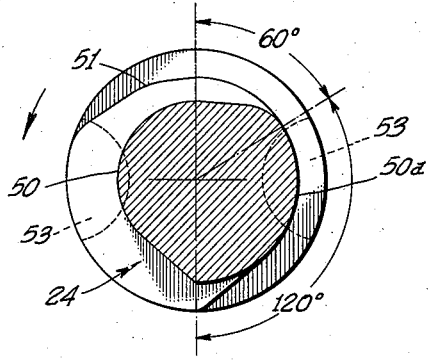
Fig. 5.
Fig. 7.
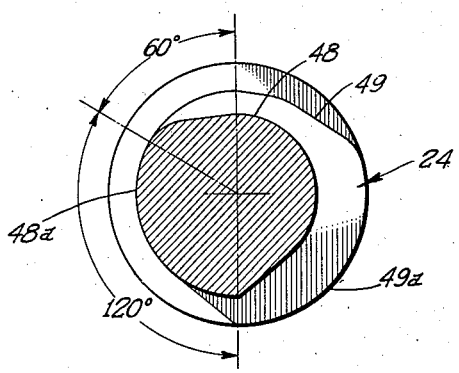
Fig. 6.
INVENTOR
OTIS C. MARTIN
BY
ATTORNEY.

Patented Apr. 14, 1942

2,279,693

REISSUED
FEB 1 1944

UNITED STATES PATENT OFFICE 2,279,693

VALVE

Otis C. Martin, Los Angeles, Calif.

Application March 11, 1940, Serial No. 323,376

5 Claims. (Cl. 277—20)

My invention relates to valves and has particular reference to a valve for controlling hydraulic or pneumatic pressure.

In fluid operated power apparatus, the types of valves which have heretofore been used have been for the most part relatively large, heavy and cumbersome pieces of apparatus and have required the complete disconnection of the valves from the pipe lines whenever repairs are required for the purpose.

In many industries the fluid power apparatus requirements are such that a relatively large number of valves must be conveniently located at a single control station so that such large and weighty pieces of apparatus are not readily adapted for compact mounting in a single control station.

For example, many of the functions of modern airplanes are controlled by either hydraulic or pneumatic power apparatus, the valves for controlling which must be located in the pilot's compartment and, as can be readily appreciated, not only the space requirements but the weight requirements of the valves become an important factor. Moreover, the valves should be capable of ready access for repair and should require a minimum of disconnection of pipe lines in order to permit such repair or replacement of parts.

It is therefore an object of my invention to provide a valve for controlling fluid power apparatus in which the valves may be made extremely light and extremely small so as to permit the ready mounting of large numbers of the valves in a small space.

Another object of my invention is to provide a valve of the character set forth in the preceding paragraph wherein the operating parts of the valves are readily accessible, and more particularly may be readily removed and replaced without requiring the disconnection of any of the pipe lines.

Another object of my invention is to provide a valve of the character set forth which is readily adapted to use in connection with other control apparatus and in which a relatively small movement of an operating lever or handle is required to open and close the valve parts while permitting unrestricted additional movement of the operating lever or handle to permit sequential operation of the valve and other control devices.

Another object of my invention is to provide a valve of the character set forth in which a 2-way valve is mounted in a single chamber to permit the ready passage of fluid between the chamber and one pipe line and between the chamber and another pipe line or to permit closing of the chamber to both lines selectively.

Other objects and advantages of my invention will be apparent from a study of the following specifications, read in connection with the accompanying drawings, wherein Fig. 1 is a perspective view of a valve constructed in accordance with my invention and illustrated diagrammatically as being connected to a 2-way piston and cylinder fluid power apparatus;

Fig. 4 is a detail elevational view of the operating shaft of my valve;

Fig. 5 is a transverse sectional view taken along line V—V of Fig. 4;

Fig. 6 is a similar transverse sectional view taken along line VI—VI of Fig. 4;

Fig. 7 is an exploded view illustrating the assembly of the valve parts included in one chamber of one valve.

Figure 1:
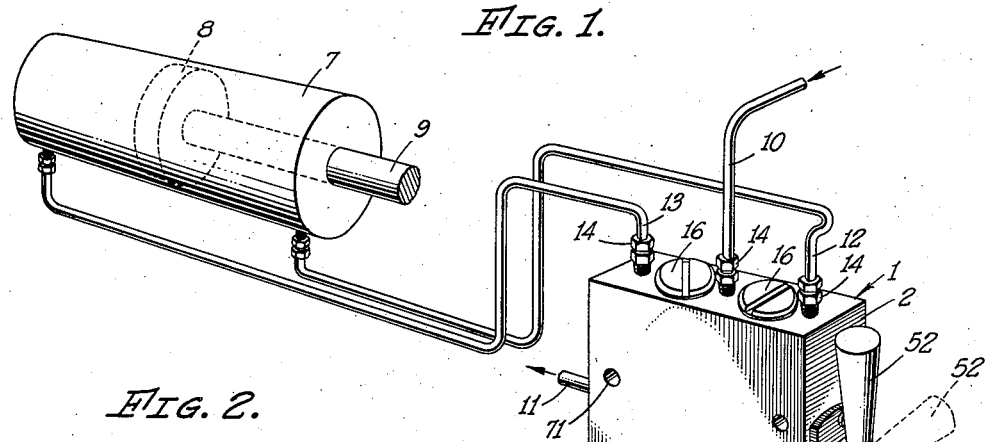

Referring to the drawings, I have illustrated in Fig. 1 a valve 1 constructed in accordance with my invention, such valve including a body member 2 which may be constructed from a single block of suitable material such as metal or plastic material though, for the purpose of permitting my valve to control pressure of several hundreds of pounds and yet be light in weight, I prefer to form the valve body block 2 from a single piece of aluminum alloy such as "duralumin." The block is provided with suitable ports 3, 4, 5 and 6 (see Fig. 2), to which may be connected respectively the pipe lines coupling my valve to a suitable source of pressure supply and to an operating fluid power apparatus, one form of which is illustrated diagrammatically in Fig. 1 as including a cylinder 7 in which operates a piston 8 coupled by means of a piston rod 9 to some piece of apparatus to be actuated thereby.

Figure 2:
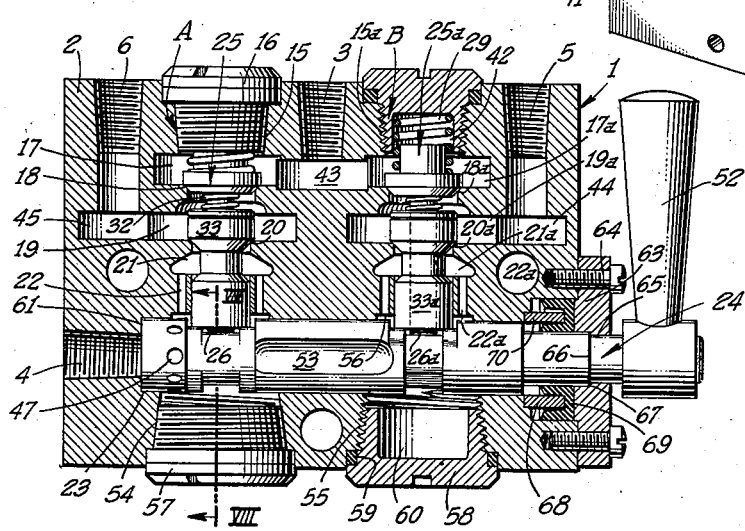
Fig. 2 is a vertical sectional view taken through the valve illustrated in Fig. 1, and illustrating the valve parts in closed position.

Referring particularly to Figs. 1 and 2, it will be observed that port 3 constitutes an inlet port for fluid pressure, to which may be coupled a pipe line 10 extending from a suitable source of pressure supply (not shown). The exhaust port 4 is similarly coupled to a pipe line 11 which may extend back to the pressure supply or may merely permit exhausting of the fluid pressure to the atmosphere. The port 5 has connected thereto a pipe line 12 which is illustrated as extending to the forward end of the cylinder 7 while the port 6 has connected thereto a pipe line 13 which extends to the opposite end of the cylinder 7.

As will be observed from an inspection of Fig. 2, the ports 3, 4, 5 and 6 may be bored and threaded to take any of the standard pipe line couplings or connectors such as illustrated at 14.

Disposed between the ports 3 and 6 is a valve chamber A formed directly in the body 2 of my valve, as by forming a bore which extends vertically down through the valve body 2, the uppermost portion of the bore being enlarged and threaded, as indicated at 15, to receive a cap nut 16. Immediately below the portion 15 is an enlarged chamber 17, the metal of the body at the lower side of the chamber 17 being tapered to form an upper valve seat 18. Below the valve seat 18 the bore is again enlarged as indicated at 19, the metal of the body at the lower side of this enlargement being tapered as indicated at 20 to form a second or lower valve seat, immediately beneath which is a third enlargement 21, from which a plurality of small bores 22 extend into a transverse bore 23 adapted to receive and house an operating shaft 24 by which the valve structure to be hereinafter described may be manipulated.

In order to adapt my valve for "4-way" operation, as for example for the controlling of a reversible piston and cylinder apparatus 7 and 8, I provide a second valve chamber bore B disposed between the ports 3 and 5, this bore constituting a duplicate of the valve chamber bore hereinbefore described including sections 15a, 17a, 19a, 21a and upper and lower valve seats 18a and 20a and small bores 22a corresponding in all respects to parts 15, 17, 18, 19, 20, 21 and 22 hereinbefore described.

In the valve chamber A I provide a valve assembly, the parts of which are illustrated particularly in Fig. 6 as including an upper valve member 25 which includes a stem 26, upon the upper end of which is an enlarged head 27 formed with upwardly disposed shoulders 28 upon which the lower end of a valve closing spring 29 may rest, a portion of the head 27 being formed with a suitable diameter to extend upwardly within the helix formed by the spring 29 to act as a guide for this spring. The lower portion of the head 27 is tapered as indicated at 30 to form a tapered seating surface adapted to seat upon the valve seat surface 18 while the head 27 is undercut as indicated at 31 for the purpose of receiving the upper end of a second valve closing spring 32.

A lower valve member 33 comprises essentially a cylindrical sleeve having an internal longitudinal bore 34 adapted to receive and pass the stem 26 of the upper valve member 25 and having an enlargement of this bore at the upper end of the valve member 33, as indicated at 35, into which may be received a packing gland or ring 36 adapted to effectively prevent leakage of fluid pressure between the stem 25 and the bore 34.

The lower valve member 33 is provided along its outer wall with an inwardly and downwardly tapered seating face 37 adapted to seat upon the seating surface 20. If desired, such seating surface 37 may be readily formed by cutting an annular groove 38 about the valve member 37, which groove will not only form the seating surface but will also provide for greater freedom of flow of fluid into the chamber 21a when the valve 33 is open.

To achieve effective sealing between the stem 26 and the bore 34, I prefer to make the packing member 36 in the form of an annular ring having an annular groove 39 extending from the upper face of the packing ring so that the effect of fluid pressure upon the upper side of the ring 39 will be to expand the packing ring into snug engagement both with the stem 26 and with the walls of the enlarged bore 35 in the valve member 33. This ring 36 may be formed of rubber, "neoprene" or other suitable material and to insure against possible collapse of the ring 36 I prefer to employ a spreader washer 40 disposed about the stem 26 and having a downwardly extending longitudinal flange 41 adapted to be received in the groove 39. The upper face of the washer 40 also constitutes an effective seat for the lower end of the valve closing spring 32.

The assembly illustrated in Fig. 6 may be inserted into the valve chamber A through the open upper end of the bore forming this chamber and will be held in place by means of the cap screw 16 which I prefer to form with a socket 42 to receive and guide the upper end of the valve closing spring 29.

Figure 3:
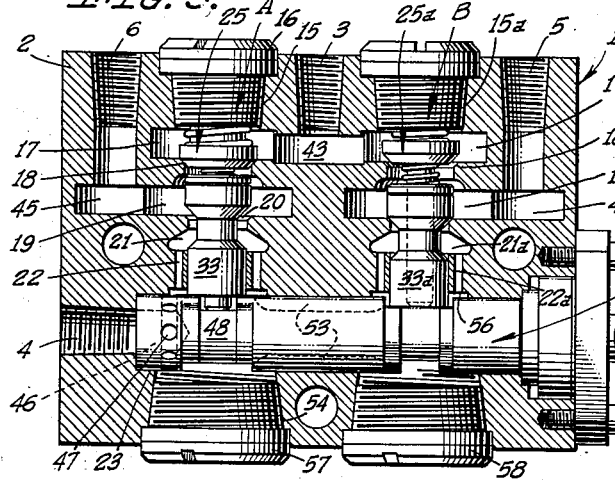
Fig. 3 is a vertical sectional view similar to Fig. 2 but illustrating the position of the valve parts upon operation of the valve handle to move the fluid power mechanism in one direction.

Referring particularly to Fig. 3, it will be apparent that when the valve assembly is disposed within the bore or chamber A, the upper valve member 25 will be tightly pressed against its seat 18 by means of the spring 29 with the extreme lower end of the stem 26 of this valve member protruding below the lower end of the valve member 33. Likewise the valve member 33 will be pressed tightly against its seat 20 by means of the spring 32, which bears at its upper end against the valve member 25. It will be noted therefore that the upper spring 29 must be considerably stronger than the spring 32 so that the valve 33 may be opened by upward movement relative to the valve 25 while the valve 25 is held closed by its spring 29.

The valve assembly in valve chamber B is a duplicate of the valve structure just described, such duplication making for economical production.

The intercommunication between the ports 3, 5 and 6 and the valve chambers A and B is readily made by the methods described and claimed in my copending application Serial No. 330,752, filed April 20, 1940, wherein it is described that the valve chambers A and B are formed by providing first a straight bore through the valve body 2, after which suitable tools described in the said application are employed to enlarge portions of this bore to form the enlarged sections or chambers 17, 19 and 21.

Similarly, as described in the said copending application, the ports 3, 5 and 6 may be formed by extending bores from the upper face of the valve body 2 to the desired depth, as indicated in Fig. 2, and then by the use of suitable tools described in the said application the lower ends of these bores may be enlarged sufficiently that the enlarged portions of the port bores intersect the enlarged portions of the valve chamber bores.

By referring to Fig. 2, it will be observed that the lower end of the port 3 has an enlarged portion 43 which intersects the enlargements 17 of chamber A and 17a of chamber B so that fluid entering port 3 may pass directly into the enlargements or chambers 17 and 17a for both of the valve assemblies. Also it will be noted that the lower end of port 5 has an enlargement 44 which intersects the enlargement of chamber B and port 6 has an enlargement 45 intersecting enlargement 19 of chamber A. Thus if valve member 25 in chamber A is open, pressure passing into port 3 will be allowed to pass valve 25 in chamber A into enlargement 19, thence to enlargement 45 in port 6 and out through port 6 through pipe 13 to the left-hand end of cylinder 7. At the same time pressure from the right-hand end of the cylinder 7 will enter through pipe 12 and port 5 and will pass through enlargement 44 and enlargement 19a for chamber B so that if at this time valve member 33a in chamber B is open such pressure will pass down to enlargement 21a and through the small bores 22a and into the handle chamber 23.

At this point it should be noted that the left-hand end of the handle chamber 23 communicates directly with exhaust port 4 and, as will be observed from an inspection of Figs. 2 and 4, the valve operating shaft is provided with means which permits fluid to flow past the shaft 24 and out of port 4.

The operating shaft 24 comprises a rod-like member, the extreme left-hand end of which is provided with a short bore 46 extending longitudinally into the end of the shaft so that a row of holes 47 extending radially through that end of the shaft will provide intercommunication between shaft chamber 23 and the bore 46 to the exhaust port 4. That part of the operating shaft 24 which is disposed immediately below the valve assembly in chamber A is provided with cam surfaces including a central surface 48, the length of which longitudinally of the shaft 24 is slightly in excess of the diameter of the protruding lower end of the stem 26 of the valve member 25. Arranged on each side of this central cam surface 48 is a pair of duplicate cam surfaces 49 adapted to engage the lower end of the lower valve member 33.

Similarly, that portion of the shaft which is disposed immediately below the valve chamber B is provided with cam surfaces 50 and 51 engaging, respectively, the lower end of the valve member 26 and the lower end of the valve member 33 disposed in chamber B.

Referring particularly to Fig. 2, it will be observed that the operating shaft 24 is in the correct position to allow all four of the valve members to be in closed position. For convenience this will be assumed to be the position when a handle 52 on the operating shaft 24 is in a vertical position.

Now by observing Fig. 5 it will be noted that the cam surface 50 is so formed that when the handle is in the vertical position the stem 26a of the valve member 25a will rest upon the lowest dwell of the cam. It will also be observed that when the handle is in the vertical position the cam surfaces 51 are so disposed below the lower end of the valve member 33a as to present the lowermost dwell of these surfaces to the valve 33a. However, with rotation of the handle member 52 to the left (that is, in a counterclockwise direction, as viewed in Figs. 1 and 5), the cam surface 51 will continue to present to the valve member 33a that portion of its surface 51a which is concentric with the axis of rotation of the shaft 24 while during the first 60° of such motion of the shaft 24 the cam surface 50 will lift the valve stem 26a, the entire movement between the fully closed position of valve 25a and its fully open position being accomplished during the first 60° of rotation of the shaft 24. It will also be noted that the next portion 50a of the cam surface 50 is concentric with the axis of rotation of the shaft so that during the next 120° of movement of the shaft the valve 26a will remain in its fully open position.

Now by observing Fig. 6, it will be noted that the cam surface 48 is identical with the surface 50 but is disposed 120° out of phase with the surface 50 and that the cam surfaces 49 are identical with cam surfaces 51 but are likewise disposed 120° out of phase with the surface 51. It follows therefore that as the handle shaft is rotated in a counterclockwise direction through the 60° movement necessary to fully open valve 25a, valve 25 in chamber A will remain closed since its stem is riding upon the concentric portion of cam surface 48 and at the same time the cam surfaces 49 will move the lower valve member 33 in chamber A to its fully open position. This is the arrangement of the valve positions shown in Fig. 3.

Figure 8:
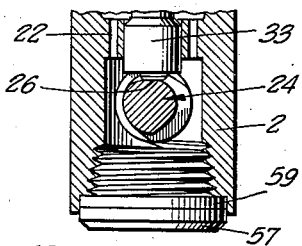
Fig. 8 is a fragmentary sectional view taken along line VIII—VIII of Fig. 2.

Thus fluid pressure coming from the source of pressure from the pipe 10 and into and through the port 3 will pass down through the now open valve 25a and thence through port 5 and line 12 to the right-hand end of the cylinder 7, the exhaust from the opposite end of the cylinder 7 passing through pipe 13 and into and through port 6, from whence it passes through the now open valve 33 in chamber A and through small bores 22 into the shaft chamber 23. It will be noted from an inspection of Fig. 8 that the shaft bore 23 is enlarged immediately adjacent each of the valve chambers A and B so that the small bores 22 may freely discharge into the shaft bore 23, the fluid then passing through the holes 47 in the shaft 24 and thence to the exhaust port 4.

With the valve in this position it is apparent that the piston 8 will be moved toward the left-hand end of the cylinder 7 and may be stopped in any intermediate position merely by restoring the operating handle 42 to its vertical position which will accomplish the closure of the valve 25a and valve 33, locking the hydraulic system in a stationary condition.

Similarly movement of the handle 52 in a clockwise direction will, by reason of the shape and location of the cam surfaces on the shaft 24 as heretofore described, cause the opening of valve 25 in chamber A and the opening of valve 33a in chamber B, thus permitting pressure fluid in the pipe 10 to pass through the port 3 through now open valve 25 and through port 6 into pipe line 13 to the left-hand end of the cylinder, where the exhaust from the right-hand end of the cylinder passes through pipe 12, port 5, now open valve 33a, and through the small bores 22a into the shaft bore 23. To permit the fluid exhausted through the small bores 22a to pass to the exhaust port 4, I prefer to provide a grooved or flattened portion 53 on the part of the shaft 24 which is disposed between the cam surfaces 48 and 50. Thus the fluid may pass along the shaft 24 and through the holes 47 and thence to the exhaust port 4.

To facilitate the construction of my valve, I prefer to provide a pair of bores 54 and 55 aligned respectively with the bores constituting the chambers A and B, which bores 54 and 55 may be made sufficiently large in diameter to readily admit the drilling tools required to drill the multiplicity of small bores 22 and 22a in each of the valve chambers. In forming such bores 54 and 55, I prefer to allow the drill to penetrate into the valve block 2 a sufficient distance to come flush with or just pass beyond the upper side of the longitudinal shaft bore 23 so that a substantially flat surface 56 is formed immediately at the end of each of the valve chambers A and B to permit ready drilling of the small bores 22 and 22a. The bores 54 and 55 may then be plugged as by using cap screws 57 and 58 threaded into the bores 54 and 55 and sealed therein by means of suitable gaskets 59. It will be noted that, like the cap screws 16, there is an internal socket 60 in each of the cap screws 57 which provides a relatively large fluid receiving chamber through which the discharge from valves 33 and 33a may readily pass and permits more ready communication between the grooves 53 on the shaft 24 with the fluid receiving chambers disposed beneath each of the valve chambers A and B and thus facilitate the passage of fluid from the valve 33a to the exhaust port 4.

Another feature of my valve is that of providing for relatively simple machining operations by which all parts of the valve may be constructed and to this end I employ as the valve operating shaft 24 a simple length of round metal stock and form the cam surfaces thereon in such manner that the original round stock constitutes the bearing surface which will rotatably bear upon the interior surfaces of a simple drilled hole extending from the right-hand end of my valve, as viewed in Fig. 2, to a point 61 spaced slightly to the left of the lower end of the valve chamber A. Thus a multiplicity of excellent bearing surfaces are provided in the bore 23 for rotatably mounting the shaft 24 and yet provides for the ready passage of the fluid from the exterior of the shaft to the interior thereof at that end of the shaft immediately adjacent the exhaust port 4.

The shaft 24 may be held in place within the valve block 2 as by providing a washer member 63 at the right-hand end of the shaft which may be readily attached to the right-hand end surface of the block 2 by means of suitable screws 64. The washer 63 is provided with a small bore 65 through which the extreme or handle end of the shaft 24 may project while a shoulder 66 may be formed upon the shaft 24 to abut either the inner surface of the washer or a corresponding shoulder 67 formed in the washer 63. The shaft may be readily packed against leakage as by providing an enlarged portion 68 of the shaft bore 23 immediately adjacent the right-hand end of the block 2 and into which may be pressed an annular packing ring 69 of rubber, "neoprene" or other suitable material, such ring 69, like the packing rings 36, being provided with an annular groove upon their inner faces which will permit fluid pressure to expand the ring into tight sealing relation with the shaft and with the block 2. Again to prevent collapse of such ring, an annular ring 70 of metal may be provided to be received in the groove of the packing ring 69.

It will be apparent from the foregoing description that my valve may be readily constructed with a series of relatively simple drilling and boring operations while the arrangement of the intersecting enlargements of the various bores provides for the intercommunicating passages between the ports and the valve chambers. Moreover, such arrangement permits the ports 3, 5 and 6 to be arranged in a straight line with respect to each other while the valve bores may also be arranged in the same straight line whereby the entire thickness of the block 2 may be made extremely small. The only limit to be placed upon this thickness is to insure an adequate thickness of wall between the side surfaces of the valve block and the largest portion 19 of the valve chamber. By actual test a valve capable of handling 1000 pounds per square inch pressure may be made by employing my construction, with a total thickness of one inch, a total height of two inches and a total length of three inches. Moreover, it will be noted that all of the ports 3, 4, 5 and 6 as well as the bores through the block for the reception of the valve assemblies and the shaft are all made from the narrow edge faces of the block, leaving the two side surfaces of the valve entirely free from openings or other possible obstructions and thus permitting these valves to be assembled one immediately against the other without interfering with ready access to all of the valve parts and without interfering with the ready connection of pipe lines to the various ports. This shape and construction also permits the ready mounting of the valves as by means of screws, bolts, rods or the like extending through suitable mounting openings 71 which may extend transversely through the block 2 and may be disposed as illustrated in Fig. 2 through portions of the block not intersected by the various shaft bores, valve chamber bores and fluid port bores.

A further advantage of my valve lies in the fact that all of the operating parts of the valve are accessible without disconnection of any of the pipe lines since all that is required to remove, repair and replace any of the valve parts is to remove the cap screws 16, whereupon the entire valve assembly shown in Fig. 7 can be bodily removed from the valve and a new assembly or such new parts as may be required may be inserted. Also the shaft may be readily removed without disconnection of any of the pipe lines by merely removing the valve assemblies and then removing the shaft.

As pointed out hereinbefore, the movement of the handle 52 away from its vertical position in either direction will operate the valves while movement of the handle through 60° or less may be utilized to completely open the valves. The further movement of the handle through the remaining portions of 180° from the vertical causes no further change in the position of the valves. This is of great importance in certain types of controls, particularly for airplanes, wherein by interconnecting the handles or shafts of several of these valves with a lever or connecting bar, one valve may be fully opened during a small amount of movement of the connecting bar, while another valve may be opened by a further movement of the bar, and another valve may be opened by a still further movement of the bar, permitting at least three valves to be operated in a desired sequence and insuring complete operation of each of the valves.

Also in connection with the operation of bomb release mechanism, the valves may be readily employed on a single operating bar or lever whereby the initial movement of the lever will open the bomb compartment doors, another portion of the operation of the lever or bar may be utilized to control a second valve to lower the bomb carriers, while an additional movement of the lever or bar may trip the bomb release triggers.

While as described herein the valve seats may be formed directly upon the metal of the body block 2, particularly when such block is constructed of such materials as "duralumin" and employed with valve members of steel or similar metal, it will be apparent to those skilled in this art that separate valve seats may be formed as inserts to be placed within the valve bores to constitute the actual seating surfaces upon which the valve members may rest.

While I have shown and described the preferred embodiment of my invention, I do not desire to be limited to any of the details of construction shown or described herein, except as defined in the appended claims.

I claim:

1. In a fluid control valve, a body member, a valve chamber bore extending from one surface of said body member, a pair of valve seats arranged in spaced relation along said bore, fluid passages communicating with said bore one disposed between said surface and said first seat, another disposed between said seats and another beyond said second seat, a pair of valves one for each of said seats disposed in said chamber for longitudinal movement relative to said bore, the uppermost of said valves having an operating stem extending through and projecting beyond the lower of said valves, an operating shaft extending into said body member and disposed for rotation about an axis intersecting the axis of said valve chamber bore, and means on said shaft for independently engaging said lower valve and the stem of said upper valve for independently and selectively lifting said valves from said seats by rotation of said shaft.

2. In a fluid control valve, a body member, a valve chamber bore extending from one surface of said body member, a pair of valve seats arranged in spaced relation along said bore, fluid passages communicating with said bore one disposed between said surface and said first seat, another disposed between said seats and another beyond said second seat, a pair of valves one for each of said seats disposed in said chamber for longitudinal movement relative to said bore, the uppermost of said valves having an operating stem extending through and projecting beyond the lower of said valves, an operating shaft extending into said body member and disposed for rotation about an axis intersecting the axis of said valve chamber bore, and cam means on said shaft for independently engaging said lower valve and the stem of said upper valve for independently lifting said valves from their seats upon rotation of said shaft, said cam means including a portion extending for a few degrees of angle about the axis of said shaft for lifting said valves and the remaining portion of said cam means being disposed concentric with the axis of rotation of said shaft, whereby movement of said shaft through a relatively small angle will open said valves and further rotation of said shaft will be ineffective to move said valves.

3. In a fluid control valve, a body member, a valve chamber bore extending from one surface of said body member and including in progressively spaced relation from said surface a portion of one diameter, an enlargement of said bore, a valve seat shoulder having a diameter substantially equal to the first named diameter, a second enlargement of said bore, a second valve seat shoulder having a diameter equal to or less than the diameter of said first seat shoulder, a third enlargement of said bore, a cylindrical portion of smaller diameter extending below said third enlargement, an operating shaft bore extending transversely below and communicating with the lower end of said valve chamber bore, and a valve assembly in said valve chamber bore including in progressively spaced relation from said surface a cap for the upper end of said bore, a spring engaging said cap, an upper valve seated upon said first seat and held thereon by said spring, a second spring engaging said upper valve, a second valve seated upon said second seat and held thereon by said second spring, said second valve having a cylindrical portion extending through the lowermost cylindrical portion of said valve chamber bore and into said shaft bore, and a stem on said first valve extending through said second valve and into said shaft bore.

4. In a fluid control valve, a body member, a valve chamber bore extending from one surface of said body member and including a pair of valve seats arranged in longitudinal spaced relation along said bore, an operating shaft bore extending transversely to and intersecting said valve chamber bore, an operating shaft in said shaft bore, means on said shaft for independently engaging and lifting either of said valves from its seat, a fluid port bore extending from said surface and parallel to the longitudinal axis of said valve chamber bore, means intercommunicating said fluid port bore and said valve chamber bore between said surface and said first valve seat, a second fluid port bore extending from said surface and parallel to the axis of said valve chamber bore, means intercommunicating said second fluid port bore with said valve chamber bore between said two seats, a third fluid port bore extending in axial alignment with said shaft bore and communicating therewith, and means extending through said shaft and intercommunicating said valve chamber bore and said last named fluid port bore for passing fluid therethrough.

5. In a fluid control valve, a body member, a pair of valve chamber bores extending from one surface of said body member and in parallel spaced relation to each other, each of said valve chambers including a pair of valve seats disposed in longitudinally spaced relation therealong, a fluid port bore extending from said surface and disposed between said valve chamber bores, fluid passage means intercommunicating said fluid port bore and both of said valve chamber bores between said surface and the first valve seat therein, a second and third fluid port bores extending from said surface and parallel to said valve chamber bores, one disposed beside one of said valve chamber bores, the other disposed beside the other of said valve chamber bores, fluid passage means intercommunicating said fluid port bores and their adjacent valve chamber bores between the valve seats of that bore, a fourth fluid port bore extending in a direction transverse to and intersecting the lower ends of both of said valve chamber bores, a valve assembly in each of said valve chamber bores including an upper valve engaging said upper seat and a lower valve engaging said lower seat, and operating means for said valves extending into said fourth fluid port bore for simultaneously lifting the upper valve in one of said chamber bores and the lower valve in the other of said chamber bores and for simultaneously lifting the lower valve in said first valve chamber and the upper valve in the second chamber.

OTIS C. MARTIN.